(12) United States Patent
Ji

(10) Patent No.: US 8,103,731 B2
(45) Date of Patent: Jan. 24, 2012

(54) METHOD AND SYSTEM FOR SENDING A NETCONF-BASED NOTIFICATION

(75) Inventor: Xiaofeng Ji, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 12/614,179

(22) Filed: Nov. 6, 2009

(65) Prior Publication Data

US 2010/0057849 A1 Mar. 4, 2010

Related U.S. Application Data

(63) Continuation of application No. PCT/CN2008/071217, filed on Jun. 6, 2008.

(30) Foreign Application Priority Data

Jul. 6, 2007 (CN) .......................... 2007 1 0126058

(51) Int. Cl.
*G06F 15/16* (2006.01)
(52) U.S. Cl. ...................................... 709/206
(58) Field of Classification Search .................... 709/206
See application file for complete search history.

(56) References Cited

FOREIGN PATENT DOCUMENTS

| | | |
|---|---|---|
| CN | 1509000 A | 6/2004 |
| CN | 1909466 A | 2/2007 |
| CN | 1921492 A | 2/2007 |
| CN | 101110822 A | 1/2008 |
| WO | 20060127178 A2 | 11/2006 |

OTHER PUBLICATIONS

European Supplementary Search Report dated (mailed) Aug. 24, 2010, issued in related European Application No. 08757628.6-2416/2166699, Huawei Technologies Co., Ltd.
Written Opinion of the International Searching Authority (translation) dated (mailed) Sep. 18, 2008, issued in related Application No. PCT/CN2008/071217, filed Jun. 6, 2008, Huawei Technologies Co., Ltd.
RFC 4741, NETCONF Protocol, Standards Track, Dec. 2006, pp. 91-95.
V, Cridlig et al., "XBGP-MAN: an XML management architecture for BGP" ACM, 2 Penn Plaza, Suite 701, New York, USA, 2006, pp. 295-309, XP040044445, sections 3.1, 3.2, figure 2.
J. Case et al., Network Working Group, "A Simple Network Management Protocol (SNMP)", rfc1157.txt, May 1990, 36 pgs.
J. Case et al., Network Working Group, "Protocol Operations for Version 2 of the Simple Network Management Protocol (SNMPv2)", rfc1905.txt, Jan. 1996, 22 pgs.
C. Lonvick, Network Working Group, "The BSD syslog Protocol", rfc3164.txt, Aug. 2001, 26 pgs.

(Continued)

*Primary Examiner* — Wing Chan
*Assistant Examiner* — Alicia Baturay
(74) *Attorney, Agent, or Firm* — Finnegan, Henderson, Farabow, Garrett & Dunner LLP

(57) ABSTRACT

A method for sending a Network Configuration Protocol (NETCONF)-based notification is disclosed. The method includes the following steps: a NETCONF server accepts a notification subscription of a NETCONF client; the NETCONF server generates a notification when an event occurs in the system, and converts the notification into a format that can be identified by the NETCONF client according to the notification subscription of the NETCONF client; and the NETCONF server sends the converted notification to the NETCONF client. A system and device for sending a NETCONF-based notification are also disclosed. With the present invention, various notification modes are compatible to implement NETCONF-based notifications.

13 Claims, 9 Drawing Sheets

OTHER PUBLICATIONS

S. Chisholm et al., Network Working Group, "NETCONF Event Notifications draft-ietf-netconf-notification-02.txt", IETF Standard-Working Draft, Internet Engineering Task Force, IETF, CH, vol. netconf, No. 2, Jun. 21, 2006 XP015044990 ISSN: 0000-0004, sections 1, 2.1.1, 2.2, 2.2.1, 2.3.1, 4, 5.1, C.3.9, 59 pgs.

S. Chisolm et al., Network Working Group, "NETCONF Event Notifications draft-ieff-netconf-notification-04.txt", Internet-Draft, Oct. 22, 2006, 40 pgs.

R. Enns Ed., et al., NETCONF Protocol, Network Working Group, RFC:4741, "NETCONF Configuration Protocol" Dec. 2006, 63 pgs.

S. Chisholm et al., Network Working Group, "NETCONF Event Notifications draft-ietf-netconf-notification-07.txt", IETF Standard-Working Draft, Internet Engineering Task Force, IETF, CH, vol. netconf. No. 7, May 15, 2007, XP015049632, ISSN: 0000-0004, sections 1.3, 2.1, 4, 3.2, 3.7, 37 pgs.

Shafer et al., "A SYSLOG Capability for NETCONF," Network Working Group Internet Draft, Jun. 20, 2006, pp. 1-16.

Wang et al., "Design of a NETCONF-Based Network Management System," Journal of Nanjinh University Posts and Telecommunications (Natural Science), Jun. 2007, vol. 26, No. 3., pp. 62-68.

European Patent Office Communication pursuant to Article 94(3) EPC, European search opinion for Application No. 08757628.6, mailed Mar. 30, 2011, Huawei Technologies Co., Ltd.

Second Chinese Office Action dated (mailed) Jan. 6, 2011, issued in related Chinese Application No. 200710126058.0.

METHOD AND SYSTEM FOR SENDING A NETCONF-BASED NOTIFICATION

CROSS-REFERENCE TO RELATED APPLICATIONS

This application is a continuation of International Application No. PCT/CN2008/071217, filed on Jun. 6, 2008, which claims priority to Chinese Patent Application No. 200710126058.0, filed on Jul. 6, 2007, both of which are hereby incorporated by reference in their entireties.

FIELD OF THE INVENTION

The present invention relates to a mobile communication technology, and in particular, to a method and system for sending a NETCONF-based notification.

BACKGROUND OF THE INVENTION

With regard to many defects of the Simple Network Management Protocol (SNMP), a Network Configuration Protocol (NETCONF) is proposed in the prior art. NETCONF overcomes the defects of SNMP basically and is applicable to management of large and complex devices. NETCONF is a configuration protocol for layered management. It provides the mechanisms such as configuration, installation, maintenance, and deletion of network devices. NETCONF uses an Extensible Markup Language (XML) to encapsulate configuration data. The protocol operations take place at the simple Remote Procedure Call (RPC) layer.

FIG. 1 shows a layered structure of NETCONF in the prior art. As shown in FIG. 1, the NETCONF protocol is conceptually divided into four layers. The first layer is the transport protocol layer. In the transport protocol layer, common protocols include the Blocks Extensible Exchange Protocol (BEEP), Secure Shell (SSH), Secure Socket Layer (SSL), and console. The second layer is the RPC layer, which includes an RPC and an RPC response. The third layer is the operations layer. In the operations layer, common operations include Get-config, Edit-config, and notification. The fourth layer is the content layer (also called the configuration management layer), which is used to manage configuration data.

In the NETCONF protocol, the system needs to provide notifications so that users know events that occur in the system in time. The events refer to events that occur on certain devices and should be noted, such as the configuration change, failure, status change, threshold crossing, and abnormal intrusion. Therefore, a NETCONF client needs to subscribe to notifications from a NETCONF server. If the subscription is successful, the NETCONF server records the subscription message of the NETCONF client in a subscription list. When an event occurs in the system, the NETCONF server sends a notification to the NETCONF client according to the recorded subscription message to inform the NETCONF client of the occurrence. If one of the following cases occurs, the NETCONF server does not send a notification to the NETCONF client: a NETCONF session is terminated; the event is beyond the subscription range; event subscription changes. It should be noted that RPC requests are never processed in a session used for the notification of events in the NETCONF server.

The preceding notification is defined only according to the lower three layers of NETCONF, and no notification mode is defined according to the entire NETCONF-based four-layer structure in the prior art. Therefore, it is expected that a similar notification mode in other application environments in the prior art will be adopted to implement NETCONF-based notifications.

SUMMARY OF THE INVENTION

Embodiments of the present invention provide a method for sending a NETCONF-based notification, and the method is compatible with various notification modes to implement NETCONF-based notifications.

Embodiments of the present invention also provide a system for sending a NETCONF-based notification, and the system is compatible with various notification modes to implement NETCONF-based notifications.

Embodiments of the present invention further provide a device for sending a NETCONF-based notification, and the device is compatible with various notification modes to implement NETCONF-based notifications.

Embodiments of the present invention further provide a device for receiving a NETCONF-based notification, and the device is compatible with various notification modes to implement NETCONF-based notifications.

The technical solution in embodiments of the present invention is as follows:

A method for sending a NETCONF-based notification includes: setting up a Transport Control Protocol (TCP)-based session between a NETCONF client and a NETCONF server; accepting, by the NETCONF server, a notification subscription of the NETCONF client; generating, by the NETCONF server, a notification when an event occurs in the system, and converting the notification into a format that can be identified by the NETCONF client according to the notification subscription of the NETCONF client; and sending, by the NETCONF server, the converted notification to the NETCONF client; wherein the converting the notification into the format that can be identified by the NETCONF client comprises: encapsulating, by the NETCONF server, the notification into an Extensible Markup Language (XML) format if the subscription request does not carry format request information; or encapsulating, by the NETCONF server, the notification into the XML format and converting the encapsulated notification into a requested format in the format request information of the NETCONF client if the subscription request further carries the format request information.

A system for sending a NETCONF-based notification includes: a NETCONF client and a NETCONF server. The NETCONF server includes: a session handler, a notification manager and an event center.

The session handler is configured to set up a Transport Control Protocol (TCP)-based session between a NETCONF client and the NETCONF server; accept a notification subscription of the NETCONF client.

The event center is configured to generate a notification when an event occurs in the system and send the notification to the notification manager.

The notification manager is configured to store a notification subscription received from the session handler in a preset subscription list; forward the notification sent by the event center to the session handler according to the subscription list.

The session handler is further configured to convert the notification sent by the notification manager into a format that can be identified by the NETCONF client, and send the converted notification to the NETCONF client, wherein the session handler converts the notification into the format that can be identified by the NETCONF client comprises: encapsulates the notification into an Extensible Markup Language (XML) format if the subscription request does not carry format request information; or encapsulates the notification into the XML format and converting the encapsulated notification into a requested format in the format request information of the NETCONF client if the subscription request further carries the format request information.

With the foregoing technical solution, the NETCONF server can generate a notification of the corresponding mode as required when an event occurs in the system, convert the generated notification into a format required by the client, and send the converted notification to the NETCONF client. In the entire system, notification formats can be converted. Therefore, there are not strict restrictions on the format of a notification generated by the NETCONF server. Thus, NETCONF-based notifications can be compatible with various notification modes.

The technical solution of the present invention is hereinafter described in detail with reference to the accompanying drawings and exemplary embodiments.

DETAILED DESCRIPTION OF THE INVENTION

Figure 1:
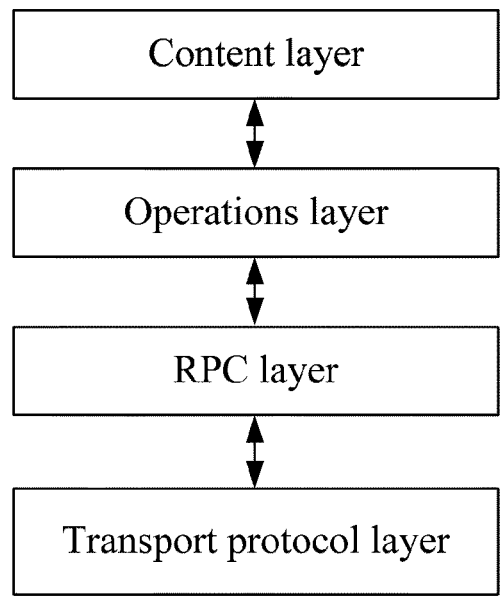
FIG. 1 shows a layered structure of NETCONF in the prior art.

To better explain the objective, technical solution, and advantages of the present invention, the following describes embodiments of the present invention in detail with reference to the accompanying drawings.

Currently, widely used notification modes include the SnmpTrap and syslog modes. SnmpTrap is classified into three versions, namely, Snmpv1Trap, Snmpv2Trap, and Snmpv3Trap.

RFC 1157 describes how to send alarm messages to an upper-layer application through Snmpv1Trap in detail. In addition, RFC 1157 defines the format of Snmpv1Trappdu, as described in Table 1.

TABLE 1

| Format of Snmpv1Trappdu | | | | | | | | | |
|---|---|---|---|---|---|---|---|---|---|
| | | | | PduData | | | | | |
| | | | | | | | | vb[n] | |
| version-ver1 | community | eid | agent addr | gid (generic-trap) | sid (specific-trap) | timestamp | name | value | ... | where:

"version-ver1" is used to identify the version of Snmpv1Trappdu.

"community" is used for an upper-layer application to authenticate the ID of the sender of an alarm message.

"eid" is an enterprise code such as 1011.

"agentaddr" is used to identify the Internet Protocol (IP) address of the sender of an alarm message.

"gid" is used to identify six common cases in which an alarm needs to be reported, including coldStart (cold start), warmStart (warm start), linkDown (connection failure), linkUp (connection setup), anthenticationFailure (authentication failure), and egpNeighborLoss (adjacent external router failure or power-off). In an actual application, integers 0-5 are used to represent the preceding six cases.

"sid" is used to identify a special case in which an alarm needs to be reported, such as a case defined by users.

"timestamp" is used to identify the alarm time.

"vb[n]", which is the abbreviation of variable binding, is used to identify the specific alarm content. One alarm message may include multiple vbs.

"name" is used to identify an alarm object, such as an interface or a Central Processing Unit (CPU).

"value" is used to identify the event content, such as interface down or overload.

RFC 1905 describes how to send alarm messages to an upper-layer application through Snmpv2Trap. In addition, RFC 1905 defines the specific format of Snmpv2Trappdu, as described in Table 2.

TABLE 2

Format of Snmpv2Trappdu

| | | PduData | | | | |
|---|---|---|---|---|---|---|
| | | vb[0] | vb[1] | | ... | vb[n](optional) |
| Version-ver2c) | community | sysup Time (used to identify the system start time) | sysupTime Value (system start time) | trapoid (used to identify an alarm object) | trapoid value (value of an alarm variable) | ... eid value |

Most of the fields in Table 2 are similar to the fields in Table 1 and are not further described.

The format of Snmpv3Trappdu is similar to the format of Snmpv2Trappdu. The difference is that "contextname" (context name) and "contextID" (context ID) are added in the format of Snmpv3Trappdu in comparison with the format of Snmpv2Trappdu.

Alarms can be reported in the preceding SnmpTrap mode, but the SnmpTrap mode is based on the User Datagram Protocol (UDP), and UDP is not a reliable protocol. Therefore, when alarms are reported in SnmpTrap mode, messages may not arrive reliably. The SnmpTrap mode uses binary PDU messages for encapsulation, and a special function library needs to be used during parsing. Therefore, the universality of SnmpTrap is affected. In addition, the SnmpTrap mode is incompatible with other notification modes.

RFC 3164 describes how to send system logs to an upper-layer application through a syslog message. In addition, RFC 3164 defines the specific format of a syslog message, as described in Table 3.

TABLE 3

Format of an Syslog Message

| PRI (Facility × 8 + Severity = PRI) | | HEADER | | MSG |
|---|---|---|---|---|
| Facility | Severity | timestamp | hostname | |

As described in Table 3, a complete syslog message consists of three parts, namely, "PRI" (priority), "HEADER" (message header), and "MSG" (message content).

"Facility" is used to identify the source of the log. In an actual application, different numerical codes are used to represent different log sources, as described in Table 4.

TABLE 4

Mapping Between Numerical Codes and Facilities

| Numerical Code | Facility |
|---|---|
| 0 | Kernel messages |
| 1 | User-level messages |
| 2 | Mail system |
| 3 | System daemons |
| 4 | Security/Authorization messages (note 1) |
| 5 | Messages generated internally by syslogd |
| 6 | Line printer subsystem |
| 7 | Network news subsystem |
| 8 | UUCP subsystem |
| 9 | Clock daemon (note 2) |
| 10 | Security/Authorization messages (note 1) |
| 11 | FTP daemon |

TABLE 4-continued

Mapping Between Numerical Codes and Facilities

| Numerical Code | Facility |
|---|---|
| 12 | NTP subsystem |
| 13 | Log audit (note 1) |
| 14 | Log alert (note 1) |
| 15 | Clock daemon (note 2) |
| 16 | Local use 0 (local0) |
| . | . |
| . | . |
| . | . |
| 23 | Local use 7 (local7) |

"Severity" is used to identify the severity of a message. In an actual application, different numerical codes represent different levels of severities, as described in Table 5.

TABLE 5

Mapping Between Numerical Codes and Severities

| Numerical Code | Severity |
|---|---|
| 0 | Emergency: system is unusable |
| 1 | Alert: action must be taken immediately |
| 2 | Critical: critical conditions |
| 3 | Error: error conditions |
| 4 | Warning: warning conditions |
| 5 | Notice: normal but significant condition |
| 6 | Informational: informational messages |
| 7 | Debug: debug-level messages |

After "Facility" and "Severity" are specified, the priority of the syslog message can be calculated through a formula "Facility×8+Severity=PRI". In the formula, 8 is a coefficient with a fixed value.

"HEADER" includes "timestamp" and "hostname". The "timestamp" is used to identify the time of generating the log. The "hostname" is used to identify the system that generates the log.

The content of "MSG" needs to be determined according to the actual situation, and therefore, it is not restricted in the syslog message format.

For example:

<34>Oct 11 22:14:15 mymachine su: 'su root' failed for lonvick on/dev/pts/8 Facility=4(security/authorization messages (note 1)), Severity=2(Critical: critical conditions)

The meaning of the preceding example is as follows: A device notifies the log host that a user is authenticated as a super user but fails to pass the authentication; this is a security authentication event, and therefore, the value of "Facility" is 4; this event is very important, but it does not affect normal running of the device, and therefore, the value of "Severity" is 2.

Similar to the SnmpTrap mode, the syslog mode can report system logs, but messages are carried over UDP. Because UDP is not a reliable protocol, messages may fail to arrive reliably. The syslog mode is incompatible with other notification modes. In addition, the syslog mode adopts text encapsulation, but the text is in a simple character string format and cannot be parsed. Thus, the universality of syslog is affected.

As mentioned above, there is no notification mode defined according to the entire NETCONF-based four-layer structure in the prior art. Therefore, it is expected that a similar notification mode in other application environments in the prior art will be adopted to implement NETCONF-based notifications. The SnmpTrap and the syslog modes have their own defects, and the adopted protocol and the message format are different from those of NETCONF. Therefore, the SnmpTrap and syslog modes in the prior art cannot be applied to NETCONF simply.

The embodiments of the present invention are based on NETCONF. Herein, a NETCONF client (hereinafter referred to as a client) subscribes to notifications from a NETCONF server (hereinafter referred to as a server); the server generates a notification when an event occurs in the system, converts the generated notification into a format that can be identified by the client, and sends the converted notification to the client.

Figure 2:
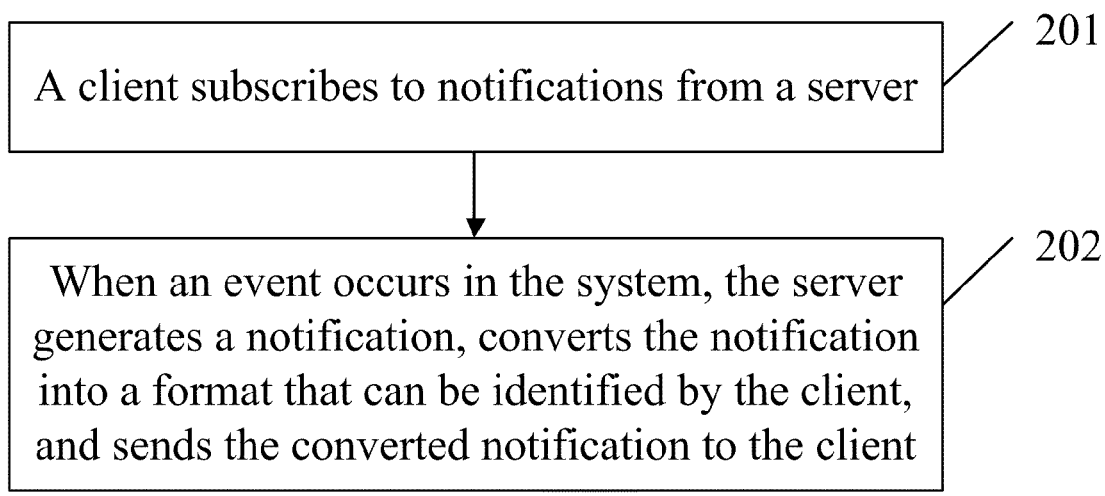
FIG. 2 is a general flowchart of a method provided according to an embodiment of the present invention.

FIG. 2 is a general flowchart of a method provided in an embodiment of the present invention. FIG. 2 includes the following steps:

Step 201: A client subscribes to notifications from a server.

In this step, a method for the client to subscribe to notifications from the server is as follows: The client sends a subscription request carrying the type of notifications that the client wants to subscribe to. After the subscription is successful, the server adds the subscription request to a preset subscription list. The subscription list stores information about clients that subscribe to notifications, such as the type of subscribed notifications. The subscription list may also store other information if such information exists. In addition, the server generates a response indicating whether the subscription is successful, converts the response into the XML format, and sends the converted response to the client.

Before this step, the method further includes: setting up a TCP-based session (such as an SSH session) between the client and the server.

Step 202: When an event occurs in the system, the server generates a notification, converts the notification into a format that can be identified by the client, and sends the converted notification to the client.

When an event occurs in the system, the server generates a notification of the corresponding type according to the type of the event, finds the client that subscribes to the notifications of the type according to the type of subscribed notifications stored in the subscription list, and sends the notification to the client.

Generally, if the client does not have a special requirement, the server encapsulates the notification into the XML format according to the default mode, and then sends the encapsulated notification to the client.

If the client wants to receive a notification in any other format, in step 201, the sent subscription request further carries format request information. Accordingly, in this step, the server further converts the encapsulated notification in the XML format into a format requested by the client.

The preceding notifications may be in various notification modes in the prior art such as SnmpTrap or syslog. In this case, the subscription request in step 201 may further carry a filter type and a required filter result. The filter type includes SUBTREE filter and XML Path Language (Xpath) filter. The filter type indicates a filter mode adopted by the server to obtain a filter result required by the client. The required filter result depends on the type of notifications that the client subscribes to. If the type of the subscribed notifications is SnmpTrap, the required filter result describes the specific SnmpTrap type of the subscribed notifications, namely, Snmpv1Trap, Snmpv2Trap, or Snmpv3Trap. If the type of the subscribed notifications is syslog, the required filter result describes the priority or the priority range of the subscribed notifications.

Accordingly, in step 202, the server obtains a notification that the client has actually subscribed to by filtering according to the filter type stored in the subscription list and the required filter result.

The following further describes a method provided in the present invention in detail through an exemplary embodiment.

Figure 3:
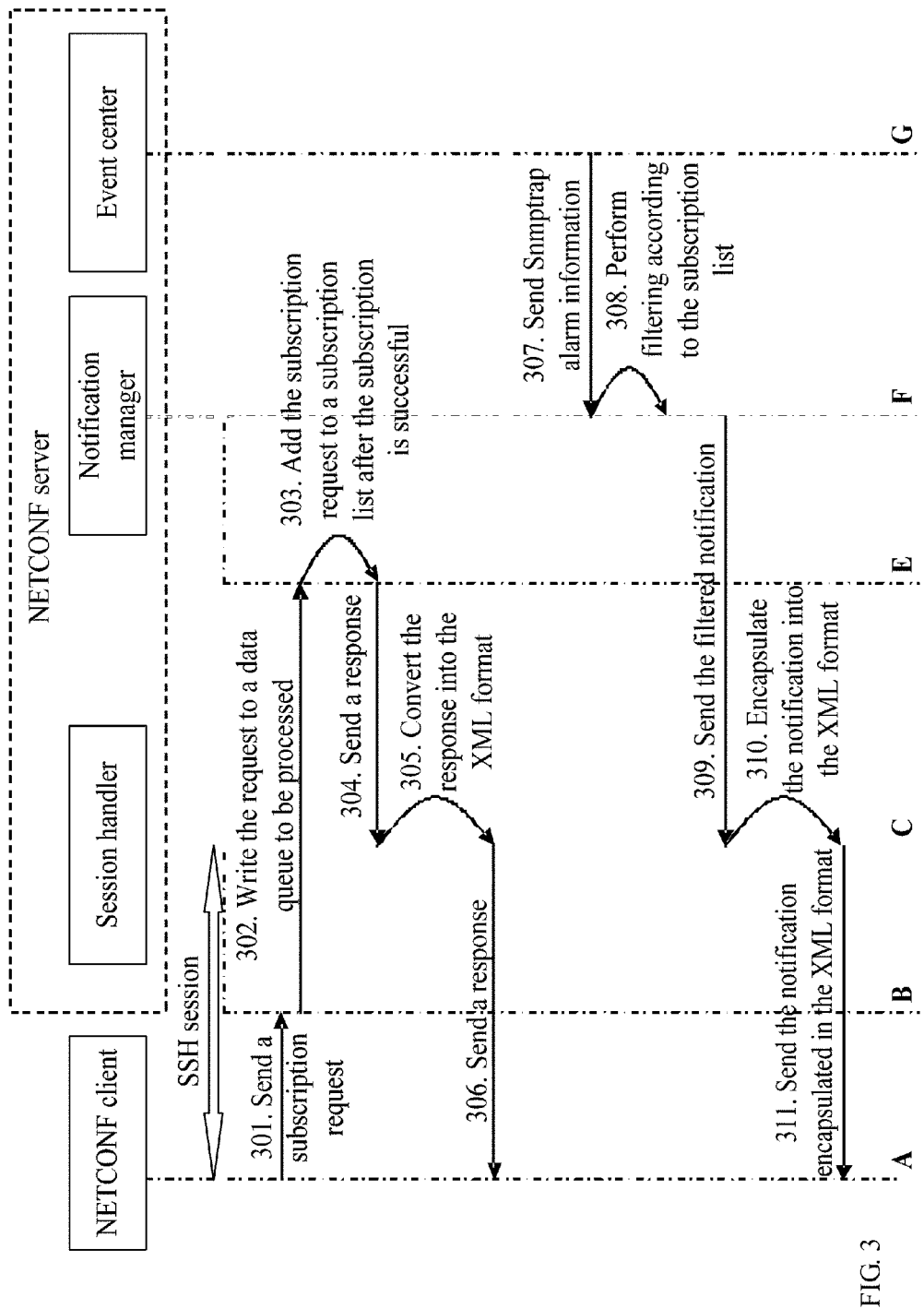
FIG. 3 is a flowchart of a method provided according to a first exemplary embodiment of the present invention.

FIG. 3 is a flowchart of a method provided in the first exemplary embodiment of the present invention. This embodiment is based on NETCONF. It is assumed that the type of a notification generated by a server is SnmpTrap. The server includes a session handler, a notification manager, and an event center.

As shown in FIG. 3, AG are different processing threads. A is a client processing thread; B is a message receiving and processing thread of server sessions; C is a message feedback and processing thread of server sessions; E is a server subscription and processing thread; F is a Trap receiving thread of server sessions; and G is an event source of a device.

As shown in FIG. 3, this embodiment includes the following steps:

A client sets up an SSH session with the session handler for subsequent information exchange between the client and the session handler. The SSH session may be set up according to the related protocol and is not further described.

Step 301: The client sends a subscription request to the session handler.

The subscription request carries the type of subscribed notifications, a filter type, and a required filter result. In this embodiment, if the type of notifications that the client subscribes to is all events with the stream of "Snmptrap over netconf", and the filter type is SUBTREE filter, the required filter result is events in the Snmpv1trap format.

In the prior art, the format of a subscription request for a NETCONF-based notification is defined clearly. The subscription request sent in this step applies to the prior art only. For example:

```
<?xml version="1.0" encoding="UTF-8"?>
    <rpc         xmlns="urn:ietf:params:xml:ns:netconf:base:1.0"
xmlns:notify="urn:ietf:params:xml:ns:netconf:notification:1.0"
xmlns:netconf="urn:ietf:params:xml:ns:netconf:base:1.0"
xmlns:xsi="http://www.w3.org/2001/XMLSchema-instance"
xsi:schemaLocation="urn:ietf:params:xml:ns:netconf:notification:1.0
    D:\project\XML\netconf\xsd\NC-Notification.xsd" message-
    id="101">
        <create-subscription
xmlns="urn:ietf:params:xml:ns:netconf:notification:1.0">
            <streams>
                <stream>snmpTrapPdu over netconf</stream>
    </streams>//Subscribe to all events with the stream of "snmptrap
    over netconf".
```

-continued

```
<filter type="subtree">//The filter type is SUBTREE filter.
    <top xmlns="http://huawei.com/comm/trap">
        <snmpTrapPdu>
            <snmpv1trap/>
        </snmpTrapPdu>//The filter result is events in the snmpv1trap format.
    </top>
</filter>
<named-profile>notification.profile</named-profile>
<startTime>2001-12-24T12:23:45</startTime>
    </create-subscription>
</rpc>
```

Step 302: The session handler writes the received subscription request into the data queue to be processed by the notification manager.

Step 303: The notification manager processes the subscription request. After the subscription is successful, the notification manager adds the subscription request to a preset subscription list.

Step 304: The notification manager sends a response to the session handler.

In this step, the notification manger generates a response indicating whether the subscription is successful, and writes the response into the data queue to be processed by the session handler.

Step 305: The session handler converts the response into the XML format.

The response generated in step 304 may be in a language format of a device, such as the C language format. Therefore, the format of the response needs to be converted in this step.

Step 306: The session handler sends the response to the client.

The session handler sends the generated response indicating whether the subscription is successful, in the XML format to the client.

Step 307: The event center sends Snmptrap alarm information to the notification manager.

When an event occurs in the system, the event center generates a notification of the corresponding type according to the type of the event. For example, if the event fails to be authenticated, the event center generates Snmpv1trap alarm information.

Assume that the Snmptrap alarm information sent from the event center to the notification manager includes Snmpv1trap and Snmpv1trap.

Step 308: The notification manager performs filtering according to the subscription list.

The notification manager finds the client that has subscribed to notifications of the Snmptrap type according to the type of the subscribed notifications stored in the subscription list, and obtains a notification in the Snmpv1trap format by SUBTREE filtering according to the stored filter type and the required filter result.

The notification manager may also adopt the Xpath filter mode to obtain a notification in the Snmpv1trap format. The two filter modes are based on the prior art and therefore not detailed herein. It should be noted that a complete PDU of a notification is taken as the basic unit for filtering no matter which filter mode is adopted; that is, the internal information is not filtered to ensure the integrity of the information.

Step 309: The notification manager sends the filtered notification to the session handler.

The notification manager writes the notification into the data queue to be processed by the session handler through a response.

Step 310: The session handler encapsulates the notification into the XML format.

In this embodiment, a method for encapsulating the notification in the SnmpTrap format into the XML format includes:

encapsulating the information carried in the SnmpTrap notification into a tag content of a NETCONF-based notification model in the prior art. The encapsulated content also needs to conform to the hierarchical structure of the NETCONF-based notification model.

Figure 4:
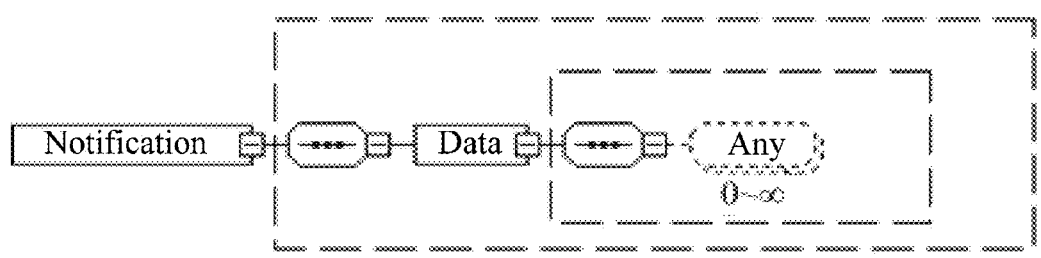
FIG. 4 shows a NETCONF-based notification model used in the embodiments of the present invention.

FIG. 4 shows a NETCONF-based notification model in the prior art. As shown in FIG. 4, "notification" and "data" indicate a tag and a sub-tag of the model respectively; a broken-line box indicates the content of a tag. "any" in the tag content of the "data" sub-tag indicates that any information can be added to this part of content as required; the symbol between "notification" and "data" and the symbol after "data" indicate that two parts before and after the symbol are in a sequence structure.

In the prior art, SnmpTrap is classified into three types, namely, Snmpv1Trap, Snmpv2Trap, and Snmpv3Trap, and the components of Snmpv1Trap, Snmpv2Trap and Snmpv3Trap are known. Therefore, in this embodiment, SnmpTrap is set to a tag (actually, it is a sub-tag of "data"); Snmpv1Trap, Snmpv2Trap, and Snmpv3Trap are set to sub-tags of SnmpTrap; and information carried in Snmpv1Trap, Snmpv2Trap, and Snmpv3Trap is set to the first-level sub-tag, second-level sub-tag, and third-level sub-tag respectively according to the relation shown in Table 1 or Table 2.

Figure 5A:
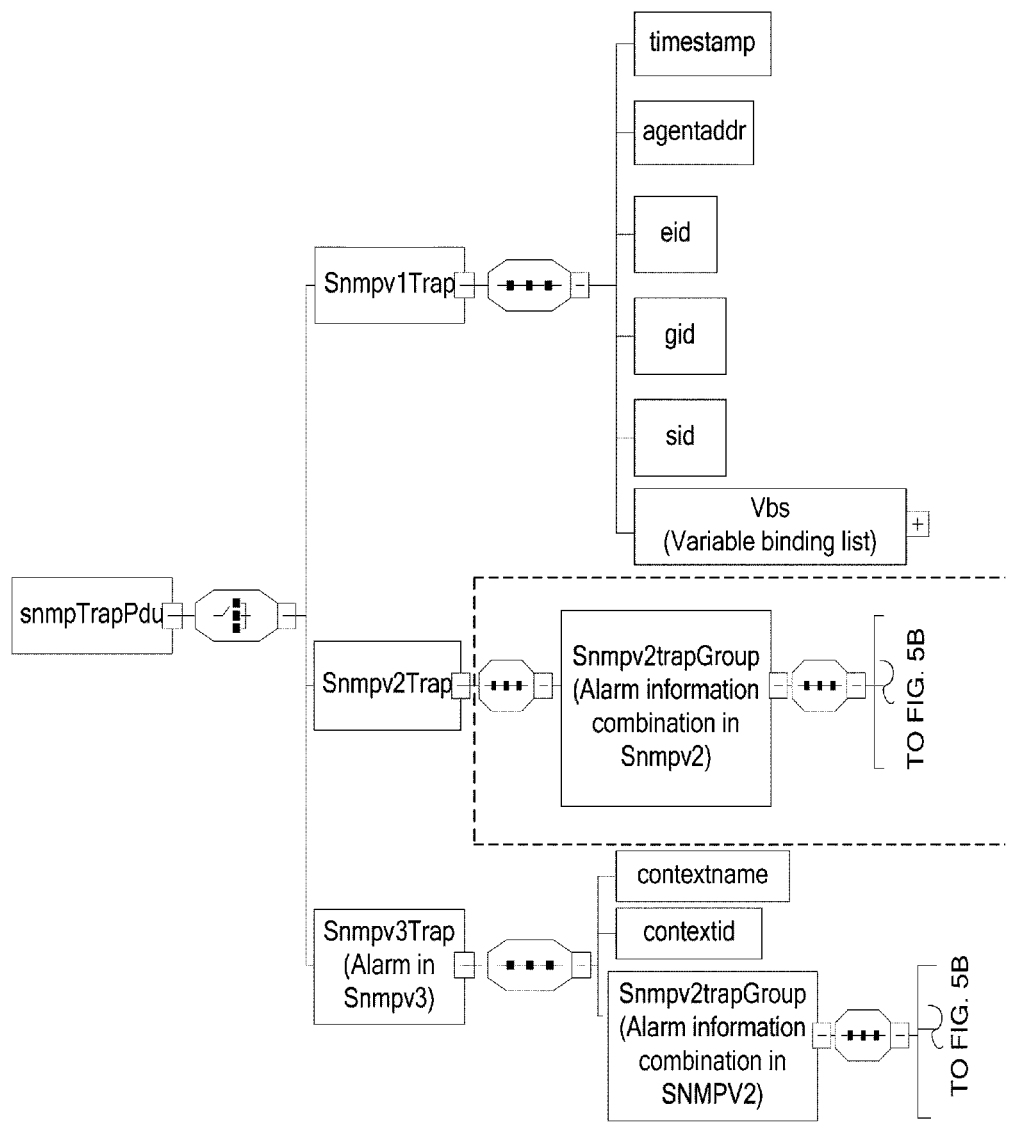
FIGS. 5A and 5B show a model of encapsulating SnmpTrap into the XML format according to an embodiment of the present invention.
Figure 5B:
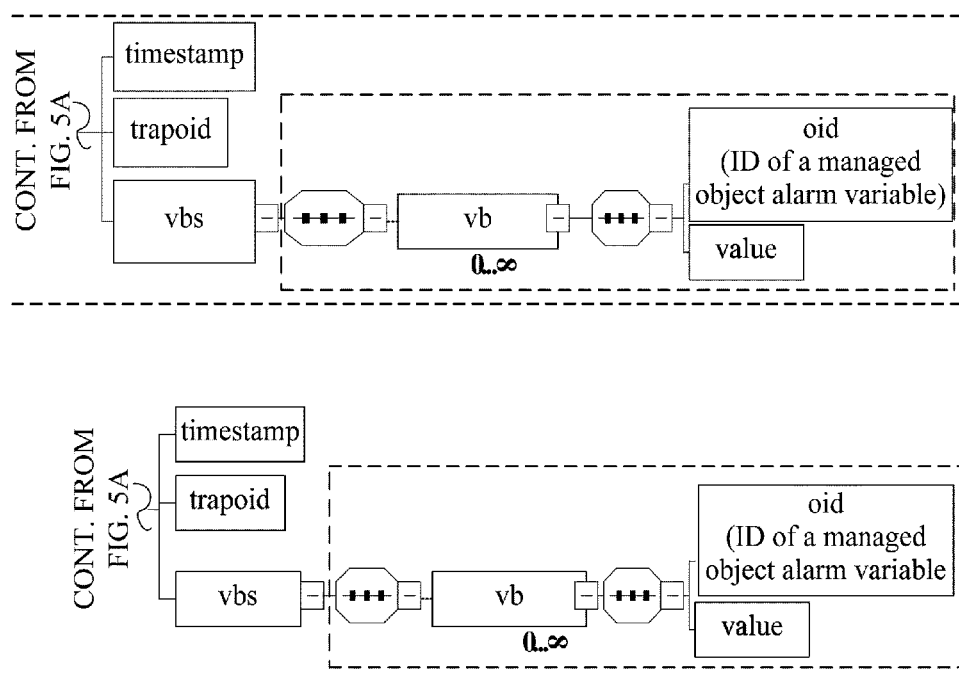

FIGS. 5A and 5B show a model of encapsulating SnmpTrap into the XML format in an embodiment of the present invention. Snmpv1Trap is taken as an example. As described in Table 1, "PduData" includes "timestamp", "agentaddr", "eid", "sid", and "vbs", and these parts are in a parallel relation. Therefore, in the encapsulation mode of Snmpv1Trap, "timestamp", "agentaddr", "eid", "sid", and "vbs" in Table 1 are set to the same-level sub-tag of Snmpv1Trap respectively. "community" in Table 1 is set to an attribute in this embodiment. The encapsulation mode of Snmpv2Trap is similar to that of Snmpv1Trap. That is, the contents (such as "vb") in "PduData" described in Table 2 are set to sub-tags of Snmpv2Trap, and the contents in "vb", such as "oid" and "value" are set to the next-level sub-tags of the "vb" sub-tag. Based on the encapsulation mode of Snmpv2Trap, the encapsulation mode of Snmpv3Trap further includes "contextname" and "contextid".

It should be noted that behind the Snmpv2Trap sub-tag shown in FIGS. 5A and 5B, a Snmpv2trapGroup sub-tag is further included. The sub-tag is set only to facilitate descriptions of the encapsulation mode of Snmpv3Trap.

To sum up, according to FIG. 4 and FIGS. 5A and 5B, the SnmpTrap encapsulation mode in embodiments of the present invention is to encapsulate all contents shown in FIGS. 5A and 5B into "any" shown in FIG. 4, and the contents encapsulated into "any" also need to conform to the hierarchical structure of the model shown in FIG. 4.

For example:

The client is notified that an interface down event occurs in the system, and the generated notification is an Snmpv1trap alarm, where, "community" is "public"; "timestamp" is "3:40"; "agentaddr" is "10.111.64.12"; "eid" is "1.3.6.1.4.1.2011"; "gid" is "2"; and "sid" is "0". The alarm has one "vb"; "oid" of the "vb" is "1.3.6.1.4.1.2011.2.1"; and "value" is "2".

The text of the Snmpv1trap alarm encapsulated into an XSD file in the XML format is as follows:

```xml
<?xml version="1.0" encoding="UTF-8"?>
<notification
    xmlns="urn:ietf:params:xml:ns:netconf:notification:1.0"
xmlns:hwtrap="http://huawei.com/common/trap"
xmlns:notify="urn:ietf:params:xml:ns:netconf:notification:1.0"
xmlns:xsi="http://www.w3.org/2001/XMLSchema-instance"
xsi:schemaLocation="http://huawei.com/common/trap
    D:\project\XML\netconf\xsd\snmptrap.xsd">
    <data>
        <snmpTrapPdu xmlns="http://huawei.com/common/trap">
            <snmpv1trap community="public">
                <timestamp>3:40</timestamp>
                <agentaddr>10.111.64.12</agentaddr>
                <eid>1.3.6.1.4.1.2011</eid>
                <gid>2</gid>
                <sid>0</sid>
                <vbs>
                    <vb>
                        <oid>1.3.6.1.4.1.2011.2.1</oid>
                        <value>2(link down)</value>
                    </vb>
                </vbs>
            </snmpv1trap>
        </snmpTrapPdu>
    </data>
</notification>
```

Step 311: The session handler sends the notification encapsulated in the XML format to the client.

It should be noted that in this embodiment, the subscription request sent by the client may further carry format request information, which describes the notification format required by the client. For example, the notification generated by the server is in the XML-Snmpv1trap format, but the client wants to receive a notification in the XML-Snmpv2trap format. In this case, step 310 further includes: the session handler converts a notification in the XML-Snmpv1trap format into the XML-Snmpv2trap format, and the adopted conversion mode may be the eXtensible Stylesheet Language Transformation (XSLT) mode.

The XSLT is a language that describes how to convert between XML documents. The XSLT and the XPath standard are jointly committed to development for network data management. The XPath standard specifies the content to be converted. The XSLT provides the corresponding complementary language that describes how to implement a conversion. The XSLT specifies a series of rules for converting source XML documents into target XML documents. In embodiments of the present invention, target XML documents may be XML-Snmpv1trap, XML-Snmpv2trap, XML-Snmpv3trap, and XML-syslog files. The conversion based on these rules can be implemented through an XSLT processor. In addition to the conversion from source XML documents into target XML documents, the XSLT is further configured to convert XML documents into files in other formats, such as Hypertext Markup Language (HTML) files.

Figure 6:
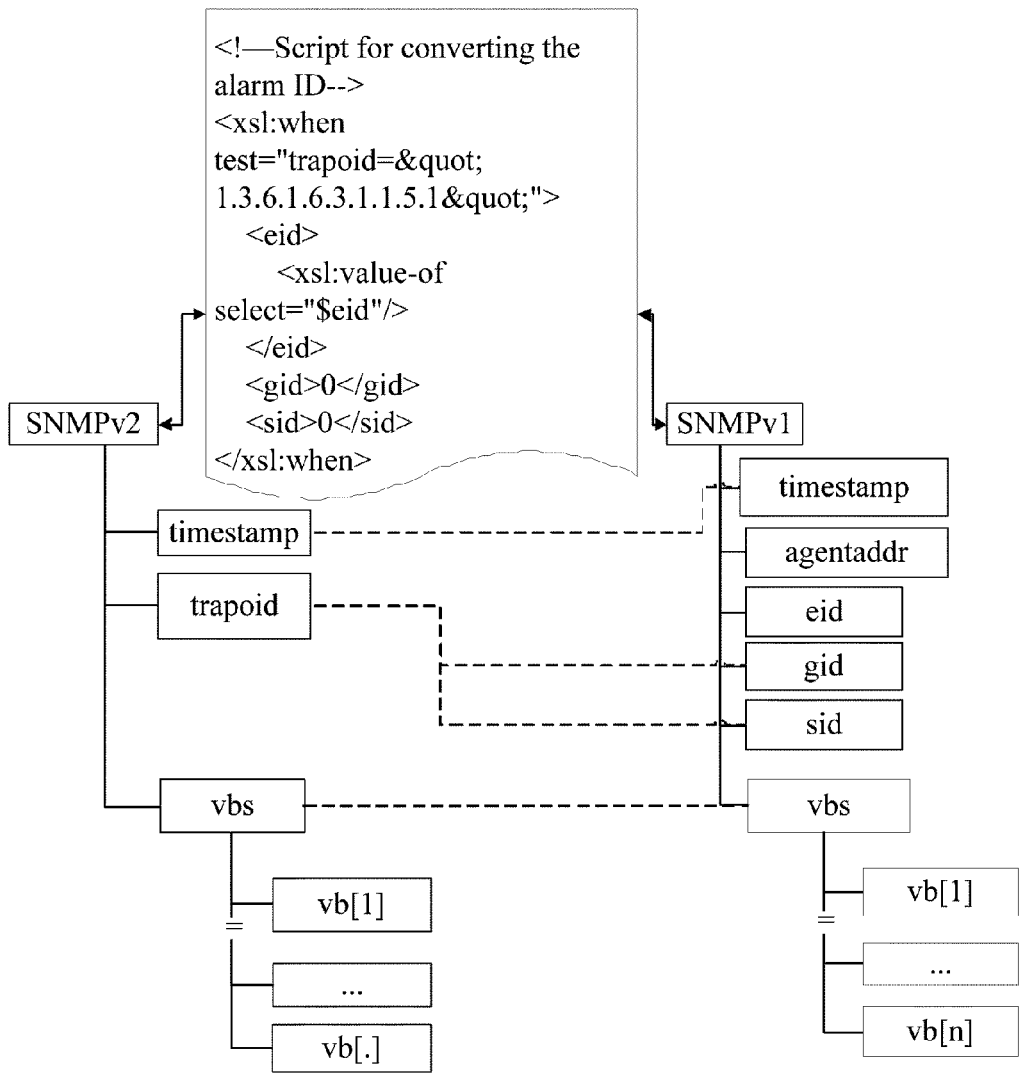
FIG. 6 shows a rule of conversion between XML-Snmpv2trap and XML-Snmpv1trap through the Extensible Stylesheet Language Transformation (XSLT) according to an embodiment of the present invention.

FIG. 6 shows a rule of conversion between XML-Snmpv2trap and XML-Snmpv1trap through the XSLT in an embodiment of the present invention. As shown in FIG. 6, "timestamp", "community", and "vbs" in two formats are mutually converted. "eid" in XML-Snmpv1trap is fixed and is a parameter entered before the conversion script is executed. "trapoid" in XML-Snmpv2trap and "gid" and "sid" in XML-Snmpv1trap are converted according to the rules described in the program in FIG. 6. That is, when "trapoid" is "1.3.6.1.6.3.1.1.5.1", the converted "gid" and "sid" are both "0". When "trapoid" is a value other than "1.3.6.1.6.3.1.1.5.1", "gid" and "sid" may be converted according to the following example.

FIG. 6 shows the conversion between XML-Snmpv2trap and XML-Snmpv1trap. For example, the XSLT script for conversion from XML-Snmpv2trap into XML-Snmpv1trap is as follows:

```xml
<?xml version="1.0" encoding="UTF-8"?>
<xsl:stylesheet                       version="1.0"
xmlns:xsl="http://www.w3.org/1999/XSL/Transform">
    <xsl:output method="xml" version="1.0" encoding="UTF-8" indent="yes"/>
    <xsl:template match="/">
        <xsl:variable name="eid">1.3.6.1.4.1.2011</xsl:variable>
        <xsl:for-each select="snmpTrapPdu">
            <xsl:element name="snmpTrapPdu">
                <xsl:for-each select="snmpv2trap">
                    <xsl:element name="snmpv1trap">
                        <xsl:attribute name="community">
                            <xsl:value-of select="@community"/>
                        </xsl:attribute>
                        <timestamp>
                            <xsl:value-of select="timestamp"/>
                        </timestamp>
                        <agentaddr>0.0.0.0</agentaddr>
                        <xsl:choose>
                            <xsl:when
test="trapoid="1.3.6.1.6.3.1.1.5.1"">
                                <eid>
                                    <xsl:value-of select="$eid"/>
                                </eid>
                                <gid>0</gid>
                <sid>0</sid>
                            </xsl:when>//When "trapoid" is "1.3.6.1.6.3.1.1.5.1",
the converted "gid" and "sid" are both "0".
                            <xsl:when
test="trapoid="1.3.6.1.6.3.1.1.5.2"">
                                <eid>
                                    <xsl:value-of select="$eid"/>
                                </eid>
                                <gid>1</gid>
                                <sid>0</sid>
                            </xsl:when>//When "trapoid" is "1.3.6.1.6.3.1.1.5.2",
```

-continued

```
the converted "gid" is "1" and the converted "sid" is "0".
                <xsl:when
test="trapoid="1.3.6.1.6.3.1.1.5.3"">
                        <eid>
                            <xsl:value-of select="$eid"/>
                        </eid>
                        <gid>2</gid>
                        <sid>0</sid>
                    </xsl:when>//When "trapoid" is "1.3.6.1.6.3.1.1.5.3",
the converted "gid" is "2" and the converted "sid" is "0".
                <xsl:when
test="trapoid="1.3.6.1.6.3.1.1.5.4"">
                        <eid>
                            <xsl:value-of select="$eid"/>
                        </eid>
                        <gid>3</gid>
                        <sid>0</sid>
                    </xsl:when>//When "trapoid" is "1.3.6.1.6.3.1.1.5.4",
the converted "gid" is "3" and the converted "sid" is "0".
                <xsl:when
teat="trapoid="1.3.6.1.6.3.1.1.5.5"">
                        <eid>
                            <xsl:value-of select="$eid"/>
                        </eid>
                        <gid>4</gid>
                        <sid>0</sid>
    </xsl:when>//When "trapoid" is "1.3.6.1.6.3.1.1.5.5", the converted "gid" is "4" and
the converted "sid" is "0".
                <xsl:when
test="trapoid="1.3.6.1.6.3.1.1.5.6"">
                        <eid>
                            <xsl:value-of select="$eid"/>
                        </eid>
                        <gid>5</gid>
                        <sid>0</sid>
                    </xsl:when>//When "trapoid" is "1.3.6.1.6.3.1.1.5.6",
the converted "gid" is "5" and the converted "sid" is "0".
                    <xsl:otherwise>
                        <eid>
                            <xsl:value-of select="$eid"/>
                        </eid>
                        <gid>6</gid>
                        <sid>
                            <xsl:value-of
select="substring(trapoid,string-length(trapoid)-2,string-length(trapoid))"/>
                        </sid>
                    </xsl:otherwise>//When "trapoid" is a value other than
the preceding values, the converted "gid" is "6" and the converted "sid" is specified
according to the mode of "select=......".
                </xsl:choose>
                <xsl:copy-of select="vbs"/>
            </xsl:element>
        </xsl:for-each>
    </xsl:element>
</xsl:for-each>
</xsl:template>
</xsl:stylesheet>
```

Figure 7:
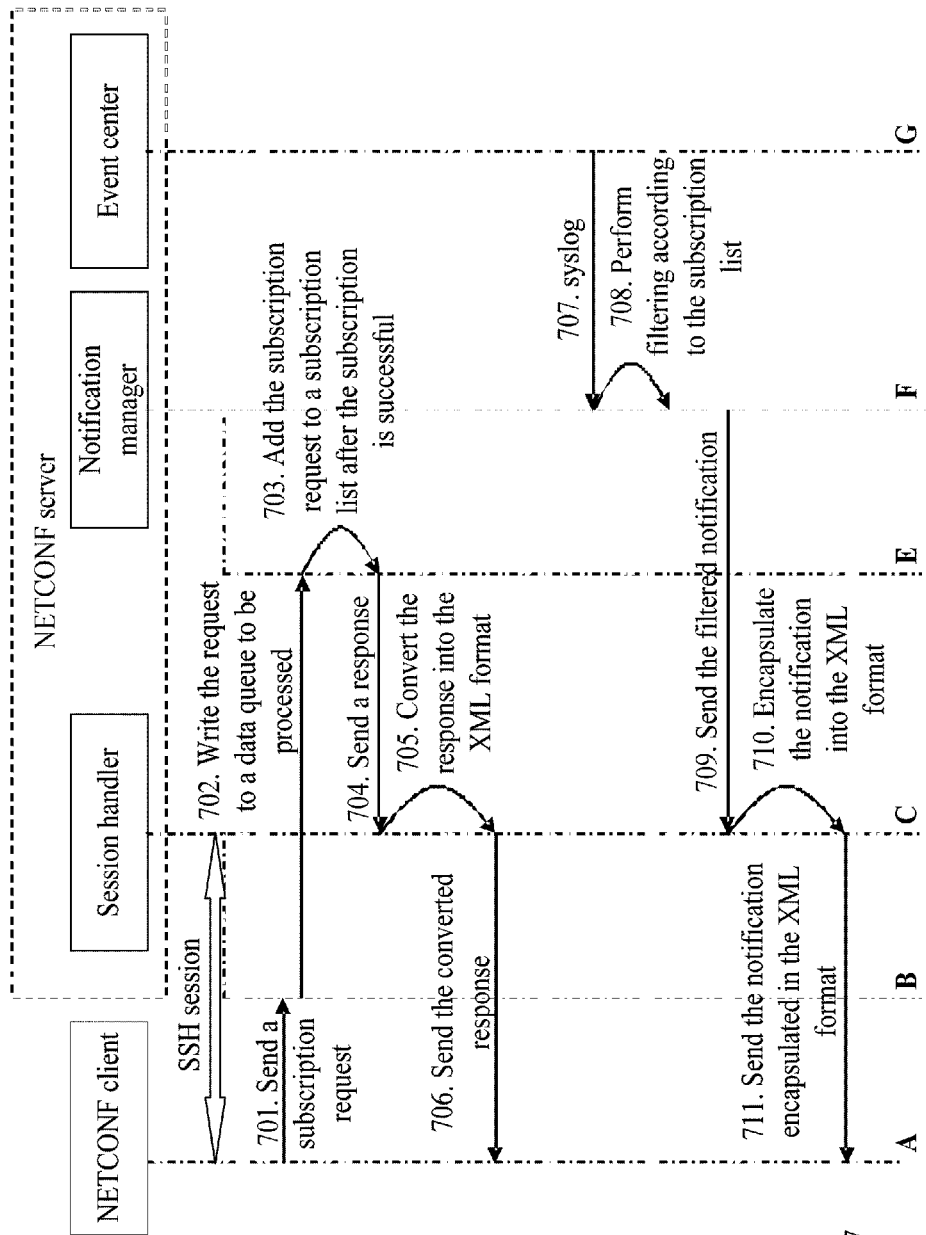
FIG. 7 is a flowchart of a method provided according to a second exemplary embodiment of the present invention.

FIG. 7 is a flowchart of a method provided in the second exemplary embodiment of the present invention. In comparison with the embodiment shown in FIG. 3, the notification generated by the server in this embodiment is in the syslog format.

As shown in FIG. 7, this embodiment includes the following steps:

A client sets up an SSH session with a session handler. The process of setting up an SSH session is based on the prior art.

Step 701: The client sends a subscription request to the session handler.

The subscription request carries the type of subscribed notifications, a filter type, and a required filter result. In this embodiment, if the type of notifications that the client subscribes to is all events with the stream of "syslog over netconf", and the filter type is Xpath filter, the required filter result is events with priorities 8-15. Furthermore, the subscription request may specify that a notification is stored to the "syslog-subscription.profile" file, and that the subscription start time is 2001-12-24T12:23:45.

In the prior art, the format of a subscription request for a NETCONF-based notification is defined clearly. The subscription request sent in this step applies to the prior art only. For example:

```
<?xml version="1.0" encoding="UTF-8"?>
    <rpc          xmlns="urn:ietf:params:xml:ns:netconf:base:1.0"
xmlns:notify="urn:ietf:params:xml:ns:netconf:notification:1.0"
xmlns:netconf="urn:ietf:params:xml:ns:netconf:base:1.0"
xmlns:xsi="http://www.w3.org/2001/XMLSchema-instance"
xsi:schemaLocation="urn:ietf:params:xml:ns:netconf:notification:1.0
    D:\project\XML\netconf\xsd\NC-Notification.xsd" message-id="101">
        <create-subscription
```

-continued

```
xmlns="urn:ietf:params:xml:ns:netconf:notification:1.0">
    <streams>
        <stream>syslog over netconf</stream>
    </streams>//Subscribe to all events with the stream of "syslog
    over netconf".
    <filter type="xpath" select="/syslogs/syslog/PRI[MsgSource=1]"/>
        //Use the Xpath filter mode to obtain events with priorities
8-15.
    <named-profile>syslog-subscription.profile</named-profile>//Store
a notification to a specified file.
    <startTime>2001-12-24T12:23:45</startTime>//Subscription start
    time.
    </create-subscription>
</rpc>
```

Steps 702-706 are similar to steps 302-306 and are not further described.

Step 707: The event center sends syslog information to the notification manager.

When an event occurs in the system, the event center generates a notification of the corresponding type according to the type of the event. Assume that the syslog information sent from the event center to the notification manager includes events of each priority.

Step 708: The notification manager performs filtering according to the subscription list.

In this step, the notification manager finds the client that has subscribed to notifications of the syslog type according to the type of the subscribed notifications stored in the subscription list, and obtains notifications of the events with priorities 8-15 by Xpath filtering according to the stored filter type and the required filter result.

The SUBTREE filter mode may also be used to obtain notifications of events with priorities 8-15. The two filter modes are based on the prior art and therefore not detailed herein. It should be noted that a complete syslog notification is taken as the basic unit for filtering no matter which filter mode is adopted; that is, the internal information is not filtered to ensure the integrity of the information.

Step 709: The notification manager sends a filtered notification to the session handler.

Step 710: The session handler encapsulates the notification into in the XML format.

In this embodiment, a method for encapsulating the notification in the syslog format into the XML format is as follows:

encapsulating the information carried in the syslog notification into a tag content of a NETCONF-based notification model in the prior art. The encapsulated content also needs to conform to the hierarchical structure of the NETCONF-based notification model.

As described in Table 3, a syslog notification consists of three parts, "PRI", "HEADER", and "MSG". The "PRI" further includes "MsgSource" and "Severity" information. The "HEADER" further includes "timestamp" and "agentaddr" information. Information in the "MSG" can be configured according to actual requirements. Therefore, in this embodiment, to encapsulate a notification in the syslog format into the XML format, syslog needs to be set to a tag, and the information carried in syslog is set to the first-level sub-tag or second-level sub-tag of syslog according to the preceding hierarchical relation.

Figure 8:
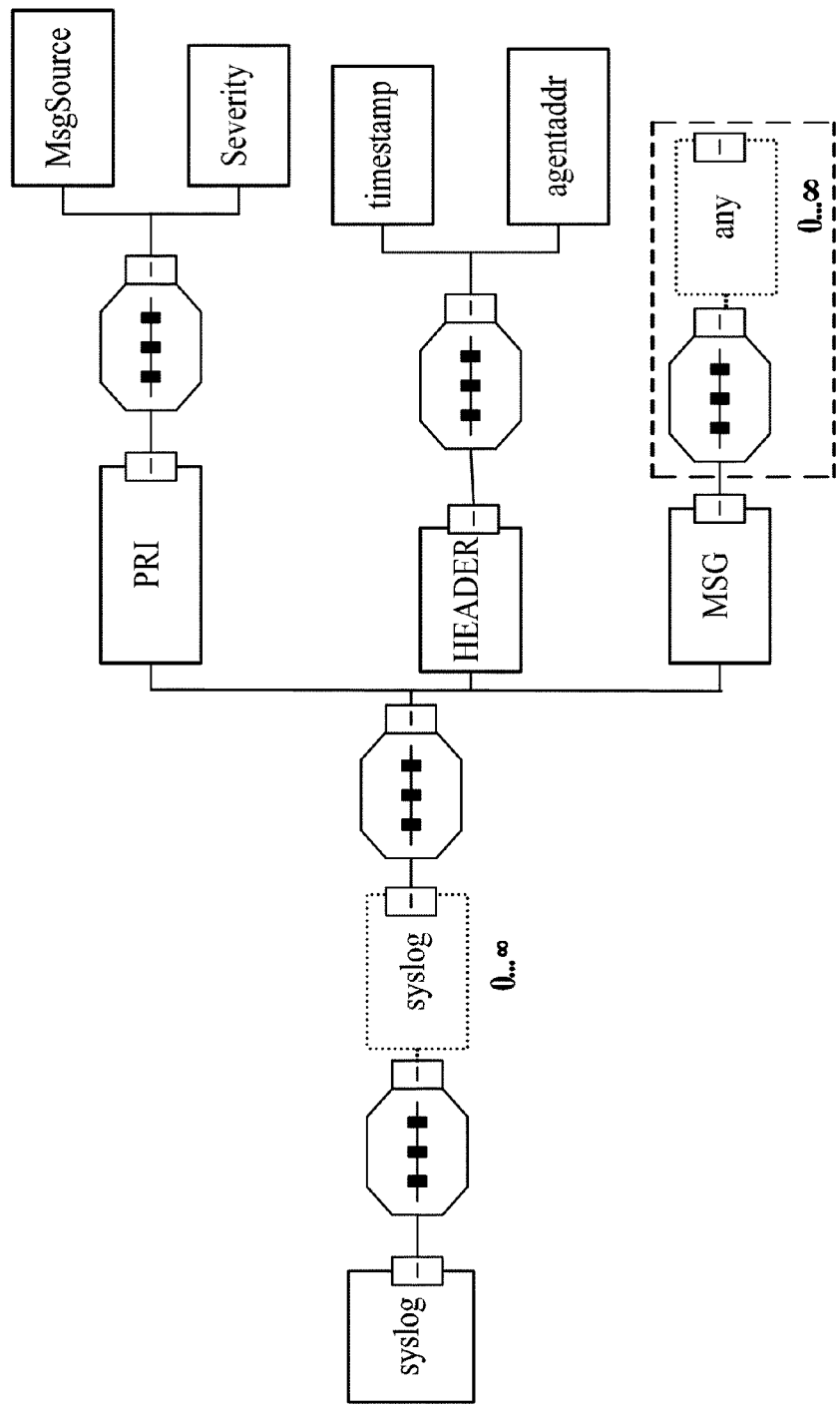
FIG. 8 shows a model of encapsulating syslog into the XML format according to an embodiment of the present invention.

FIG. 8 shows a model of encapsulating syslog into the XML format in an embodiment of the present invention. As shown in FIG. 8, "PRI", "HEADER", and "MSG" are set to three sub-tags of the syslog tag, and the information carried in "PRI", "HEADER", and "MSG" is further set to a sub-tag of "PRI", "HEADER" and "MSG" respectively. Before the syslog tag shown in FIG. 8, a syslogs tag is further included. The syslogs tag is used to encapsulate multiple syslog notifications into the same syslogs notification for sending.

To sum up, according to FIG. 4 and FIG. 8, the syslog encapsulation mode in embodiments of the present invention is to encapsulate all contents shown in FIG. 8 into "any" shown in FIG. 4, and the contents encapsulated into "any" also need to conform to the hierarchical structure of the model shown in FIG. 4.

For example:

The client is notified that an interface down event occurs in the system, and the generated notification is a syslog notification, where, "PRI" is "8"; "timestamp" is "2001-12-24T12: 23:45"; "agentaddr" is "10.111.64.12"; the alarm interface index is "1"; and alarm information is "linkDown". The text of the syslog notification encapsulated into an XSD file in the XML format is as follows:

```
<?xml version="1.0" encoding="UTF-8"?>
    <notification
    xmlns="urn:ietf:params:xml:ns:netconf:notification:1.0"
xmlns:hwsyslog="http://huawei.com/common/syslog"
    xmlns:notify="urn:ietf:params:xml:ns:netconf:notification:1.0"
xmlns:xsi="http://www.w3.org/2001/XMLSchema-instance"
xsi:schemaLocation="http://huawei.com/common/syslog syslog.xsd">
    <data>
        <syslogs xmlns="http://huawei.com/common/syslog">
            <syslog>
                <PRI>
                    <MsgSource>1</MsgSource>
                    <Severity>0</Severity>
                </PRI>
                <HEADER>
                    <timestamp>2001-12-24T12:23:45</timestamp>
                    <agentaddress>10.111.64.12</agentaddress>
                </HEADER>
                <MSG>
                    <top xmlns="http://huawei.com/syslogmsg">
                        <code>2011</code>
                        <ifindex>1</ifindex>
                        <alarminfo>linkdown</alarminfo>
                    </top>
                </MSG>
            </syslog>
        </syslogs>
    </data>
</notification>
```

Step 711: The session handler sends the notification encapsulated in the XML format to the client.

The subsequent process is similar to the embodiment shown in FIG. 3 and is not further described.

Figure 9:
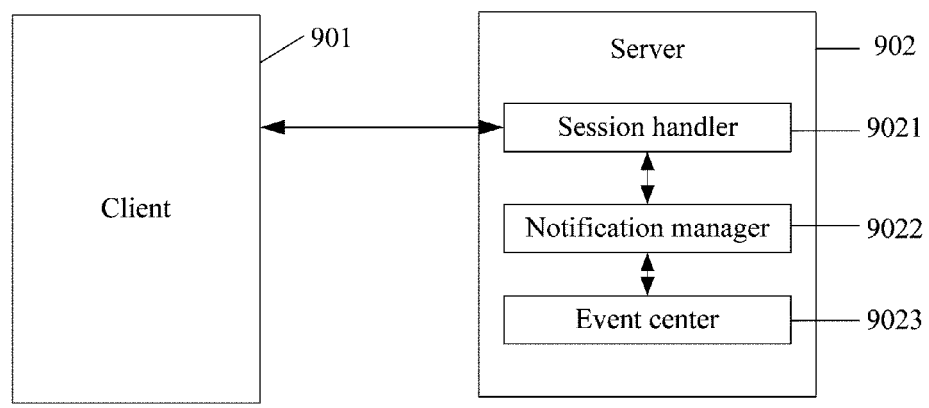
FIG. 9 shows a structure of a system provided according to an embodiment of the present invention.

According to the preceding method, FIG. 9 shows a structure of a system provided in an embodiment of the present invention. As shown in FIG. 9, the system includes a client 901 and a server 902.

The client 901 is configured to subscribe to notifications from the server 902 and receive notifications sent by the server 902.

The server 902 is configured to generate a notification when an event occurs in the system, convert the notification into a format that can be identified by the client 901, and send the converted notification to the client 901.

The server 902 includes a session handler 9021, a notification manager 9022, and an event center 9023.

The session handler 9021 is configured to: send a subscription request received from the client 901 to the notification manager 9022, the subscription request carrying the type of notifications that the client wants to subscribe to, convert a response received from the notification manager 9022 into the XML format, send the converted response to the client 901, receive a notification sent from the notification manager 9022, convert the notification into the XML format, and send the converted notification to the client 901.

The notification manager 9022 is configured to: add the subscription request received from the session handler 9021 to a preset subscription list, return a response indicating whether the subscription is successful to the session handler 9021, receive a notification sent from the event center 9023, obtain the client that has subscribed to notifications of the type by filtering according to the subscription list, and send the notification to the session handler 9021.

The event center 9023 is configured to generate a notification of a type corresponding to an event that occurs in the system and send the notification to the notification manager 9022.

The preceding subscription request may further carry a filter type and a required filter result. Accordingly, the notification manager 9022 is further configured to obtain a notification that is actually subscribed to by the client 901 according to the filter type and the required filter result.

If necessary, the preceding subscription request may further carry format request information. Accordingly, the session handler 9021 is further configured to convert a notification in the XML format into a requested format in the format request information of the client 901.

Therefore, with the technical solution of the present invention, various notification modes are compatible effectively. The client and the server adopt the SSH connection bearer protocol, and the SSH uses a TCP connection to encrypt the content, thus ensuring reliable arrival of a notification and the security of the information content. Notifications are sent through XML text streams; therefore, the notifications can be converted easily by using the XSLT at any layer, thus facilitating the subsequent processing of the client. In embodiments of the present invention, many notifications are placed in the same XML file for transmission, thus reducing the interactions and data traffic. In addition, in embodiments of the present invention, it is very convenient to implement filter subscription. Filter modes are not only flexible, but also implement the personalized filter for each target.

The client includes a subscribing module and a receiving module.

The subscribing module is configured to subscribe to notifications from a NETCONF server. The receiving module is configured to receive a notification sent by the NETCONF server. The notification is generated when an event occurs in the system and converted by the NETCONF server according to the notification subscription of the subscribing module into a format that can be identified by the NETCONF client.

It is understandable to those skilled in the art that all or part of the steps of the foregoing embodiments may be implemented by hardware instructed by a program. The program may be stored in a computer-readable storage medium. When being executed, the program performs the steps of the foregoing method embodiments. The storage medium may be any medium capable of storing program codes, for example, a Read-Only Memory (ROM), a Random Access Memory (RAM), a magnetic disk, and a compact disk.

Although the technical solution of the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for sending a Network Configuration Protocol (NETCONF)-based notification, comprising:
   setting up a Transport Control Protocol (TCP)-based session between a NETCONF client and a NETCONF server;
   accepting, by the NETCONF server, a notification subscription of the NETCONF client;
   generating, by the NETCONF server, a notification when an event occurs in a system, converting the notification into a format that can be identified by the NETCONF client according to the notification subscription of the NETCONF client; and
   sending, by the NETCONF server, the converted notification to the NETCONF client;
   wherein the converting the notification into the format that can be identified by the NETCONF client comprises:
   encapsulating, by the NETCONF server, the notification into an Extensible Markup Language (XML) format if the subscription request does not carry format request information; or
   encapsulating, by the NETCONF server, the notification into the XML format and converting the encapsulated notification into a requested format in the format request information of the NETCONF client if the subscription request further carries the format request information;
   if the type of the notification is Simple Network Management Protocol Trap (SnmpTrap), the encapsulating the notification into the XML format comprising:
   encapsulating, by the NETCONF server, the information carried in the SnmpTrap notification into a tag content according to a NETCONF-based notification model, wherein: the encapsulated content conforms to a hierarchical structure of the NETCONF-based notification model; the notification model is in a hierarchical structure that comprises a tag, a sub-tag, and a tag content; and the sub-tag is a data tag;
   if the type of the notification is system log (syslog), the encapsulating the notification into the XML format comprising:
   encapsulating, by the NETCONF server, the information carried in the syslog into a tag content according to a NETCONF-based notification model, wherein: the encapsulated content conforms to a hierarchical structure of the NETCONF-based notification model; the notification model is in a hierarchical structure that comprises a tag, a sub-tag, and a tag content; and the sub-tag is a data tag;
   wherein the syslog comprises a "PRI", a "HEADER", and an "MSG", wherein: the "PRI" comprises "Msg-Source", log source, and "Severity" information: the "HEADER" comprises "timestamp" and "agentaddr" information; and information in the "MSG" is configured according to users' requirements; and
   the method for the NETCONF server to encapsulate information carried in the syslog into the tag content comprising:
   setting, by the NETCONF server, the syslog to a tag and setting information carried in the syslog to different levels of sub-tags of the syslog tag accord hierarchical relation; and
   setting, by the NETCONF server, a tag as syslogs and setting one or more syslog tags as sub-tags of the syslog.

2. The method of claim 1, wherein the accepting the notification subscription of the NETCONF client comprises:
receiving, by the NETCONF server, a subscription request sent by the NETCONF client, wherein the subscription request carries a type of subscribed notification that the NETCONF client wants to subscribe to; and
adding, by the NETCONF server, the subscription request to a preset subscription list after the subscription is successful.

3. The method of claim 2, wherein the generating the notification comprises:
generating, by the NETCONF server, the notification of a type corresponding to the type of the event that occurs.

4. The method of claim 3, wherein before the NETCONF server converts the encapsulated notification into the requested format that can be identified by the NETCONF client, the method further comprises:
finding, by the NETCONF server, the NETCONF client that has subscribed to notifications of the type according to the type of subscribed notifications stored in the subscription list.

5. The method of claim 1, wherein the subscription request further carries a filter type and a required filter result; and the filter type is SUBTREE or XML Path Language (Xpath) filter.

6. The method of claim 5, wherein before the NETCONF server converts the notification into the requested format that can be identified by the NETCONF client, the method further comprises:
obtaining, by the NETCONF server, a notification actually subscribed to by the NETCONF client by filtering according to the filter type stored in the subscription list and the required filter result.

7. The method of claim 5, wherein the method for the NETCONF server to convert the notification that is encapsulated into the XML format into a requested format in the format request information of the NETCONF client comprises:
converting, by the NETCONF server, the notification in the XML format into the format requested by the NETCONF client through Extensible Stylesheet Language Transformation (XSLT).

8. A device for sending a Network Configuration Protocol (NETCONF)-based notification which is a NETCONF server, comprising a session handler, a notification manager, and an event center, wherein:
the session handler sets up a Transport Control Protocol (TCP)-based session between a NETCONF client and the NETCONF server; accepts a notification subscription of the NETCONF client;
the event center generates a notification when an event occurs in a system and sends the notification to the notification manager;
the notification manager stores a notification subscription received from the session handler in a preset subscription list; forwards the notification sent by the event center to the session handler according to the subscription list; and the session handler further converts the notification sent by the notification manager into a format that can be identified by the NETCONF client, and sends the converted notification to the NETCONF client;
wherein the session handler performs:
encapsulating the notification into an Extensible Markup Language (XML) format if the subscription request does not carry format request information; or
encapsulating the notification into the XML format and converting the encapsulated notification into a requested format in the format request information of the NETCONF client if the subscription request further carries the format request information;
wherein if the type of the notification is Simple Network Management Protocol Trap (SnmpTrap), the encapsulating the notification into the XML format comprises:
encapsulating the information carried in the SnmpTrap notification into a tag content according to a NETCONF-based notification model, wherein: the encapsulated content conforms to a hierarchical structure of the NETCONF-based notification model; the notification model is in a hierarchical structure that comprises a tag, a sub-tag, and a tag content; and the sub-tag is a data tag;
wherein if the type of the notification is system log (syslog), the encapsulating the notification into the XML format comprises:
encapsulating the information carried in the syslog into a tag content according to a NETCONF-based notification model, wherein the encapsulated content conforms to a hierarchical structure of the NETCONF-based notification model; the notification model is in a hierarchical structure that comprises a tag, a sub-tag, and a tag content; and the sub-tag is a data tag;
wherein syslog comprises a "PRI", a "HEADER", and an "MSG", wherein: the "PRI" comprises "MsgSource", log source, and "Severity" information; the "HEADER" comprises "timestamp" and "agentaddr" information; and information in the "MSG" is configured according to users' requirements; and
wherein the encapsulating information carried in the syslog into the tag content comprises:
setting the syslog to a tag and setting information carried in the syslog to different levels of sub-tags of the syslog tag according to the hierarchical relation; and
setting a tag as syslogs and setting one or more syslog tags as sub-tags of the syslogs.

9. The device of claim 8, wherein:
the subscription request further carries a filter type and a required filter result; and the notification manager obtains a notification actually subscribed to by the NETCONF client by filtering according to the filter type and the required filter result.

10. The device of claim 9, wherein:
the filter type is SUBTREE or XML Path Language (Xpath) filter.

11. A system for sending a Network Configuration Protocol (NETCONF)-based notification, comprising a NETCONF client and a NETCONF server, wherein:
the NETCONF client subscribes to notifications from the NETCONF server and receives notifications sent by the NETCONF server; and
the NETCONF server sets up a Transport Control Protocol (TCP)-based session between the NETCONF client and the NETCONF server; generates a notification when an event occurs in the system, converts the notification into a format that can be identified by the NETCONF client according to the notification subscription of the NETCONF client, and sends the converted notification to the NETCONF client;
wherein the NETCONF server performs:
encapsulating the notification into an Extensible Markup Language (XML) format if the subscription request does not carry format request information; or
encapsulating the notification into the XML format and converting the encapsulated notification into a requested format in the format request information of the NET- CONF client if the subscription request further carries the format request information;

wherein if the type of the notification is Simple Network Management Protocol Trap (SnmpTrap), the encapsulating the notification into the XML format comprises:

encapsulating the information carried in the SnmpTrap notification into a tag content according to a NETCONF-based notification model, wherein: the encapsulated content conforms to a hierarchical structure of the NETCONF-based notification model; the notification model is in a hierarchical structure that comprises a tag, a sub-tag, and a tag content; and the sub-tag is a data tag;

wherein if the type of the notification is system log (syslog), the encapsulating the notification into the XML format comprises:

encapsulating the information carried in the syslog into a tag content according to a NETCONF-based notification model, wherein the encapsulated content conforms to a hierarchical structure of the NETCONF-based notification model; the notification model is in a hierarchical structure that comprises a tag, a sub-tag, and a tag content; and the sub-tag is a data tag;

wherein syslog comprises a "PRI", a "HEADER", and an "MSG", wherein: the "PRI" comprises "MsgSource", log source, and "Severity" information; the "HEADER" comprises "timestamp" and "agentaddr" information; and information in the "MSG" is configured according to users' requirements; and wherein the encapsulating information carried in the syslog into the tag content comprises:

setting the syslog to a tag and setting information carried in the syslog to different levels of sub-tags of the syslog tag according to the hierarchical relation; and setting a tag as syslogs and setting one or more syslog tags as sub-tags of the syslogs.

12. The system of claim 11, wherein:

the subscription request further carries a filter type and a required filter result; and the NETCONF server obtains a notification actually subscribed to by the NETCONF client by filtering according to the filter type and the required filter result.

13. The system of claim 12, wherein:

the filter type is SUBTREE or XML Path Language (Xpath) filter.

* * * * *